United States Patent [19]
Waltonen

[11] Patent Number: 4,966,666
[45] Date of Patent: Oct. 30, 1990

[54] FLUID ENERGIZING METHOD AND APPARATUS

[75] Inventor: James R. Waltonen, Salt Lake City, Utah

[73] Assignee: Waltonen Laboratories, Salt Lake City, Utah

[21] Appl. No.: 237,918
[22] PCT Filed: Nov. 24, 1986
[86] PCT No.: PCT/US86/02573
 § 371 Date: Jul. 18, 1988
 § 102(e) Date: Jul. 18, 1988
[87] PCT Pub. No.: WO88/03835
 PCT Pub. Date: Jun. 2, 1988

[51] Int. Cl.$^5$ .................. B01J 19/08; C01B 13/11
[52] U.S. Cl. ..................... 204/164; 204/165; 204/168; 204/169; 204/176; 204/179; 313/231.31; 313/231.41; 422/186.04; 422/186.07; 422/186.12; 422/186.15; 422/186.18; 422/186.19; 422/186.2; 422/186.21; 422/186.22

[58] Field of Search .............. 204/164, 176; 422/186, 422/186.04, 186.07, 186.12, 186.15, 186.18, 186.19, 186.2, 186.21; 313/231.31, 231.41

[56] References Cited
U.S. PATENT DOCUMENTS

| 945,917 | 1/1910 | Cottrell | 361/230 |
| 1,011,503 | 12/1911 | Shepherd | 422/186.18 |
| 2,822,327 | 2/1958 | Hammesfahr et al. | 422/186.07 |
| 2,936,279 | 5/1960 | Rindtorff | 422/186.15 |
| 3,205,162 | 9/1965 | MacLean | 422/186.04 |
| 3,308,050 | 3/1967 | Denis | 422/186.03 |
| 3,442,788 | 5/1969 | Wooton et al. | 422/186.15 |
| 3,739,440 | 6/1973 | Lund et al. | 445/26 |
| 3,979,193 | 9/1976 | Sikich | 422/186.04 |
| 4,136,027 | 1/1979 | Sakamoto et al. | 204/176 |
| 4,159,971 | 7/1979 | Gneupel | 422/186.19 |
| 4,462,965 | 7/1984 | Azuma et al. | 422/186.08 |

FOREIGN PATENT DOCUMENTS 2144610 3/1985 United Kingdom.

Primary Examiner—John F. Niebling
Assistant Examiner—David G. Ryser
Attorney, Agent, or Firm—Kolisch, Hartwell & Dickinson

[57] ABSTRACT

The energizer of the instant invention includes an electric discharge apparatus for creating an electric discharge and a focusing mechanism for focusing the electric discharge on a fluid to be energized. In a preferred embodiment of the invention, the focusing mechanism takes the form of a dielectric core which is constructed and arranged to focus the electric discharge into a passage formed about the periphery of the core thereby enabling the use of energy levels substantially higher than would be possible without the focusing means.

A method of energizing a fluid is taught which includes introducing the fluid into a confined region, providing an electric discharge for energizing the fluid and focusing the discharge into the confined region.

26 Claims, 4 Drawing Sheets

FLUID ENERGIZING METHOD AND APPARATUS

TECHNICAL FIELD

This invention relates to a fluid energizing apparatus.

BACKGROUND ART

Various fluids may be energized, thereby dissociating one or more electrons from a molecule and allowing recombination in an altered form. This process is particularly useful in the generation of ozone ($O_3$) from either oxygen ($O_2$) or air and is additionally useful in the reduction of complex organic molecules into simple compounds or elemental matter.

Ozone is a metastable substance. The synthesis of ozone from its ingredients is characterized by numerous contradictions in both kinetic and thermodynamic considerations. Large deviations between the theoretical data and the values attainable in practice are encountered. Ozone is, however, a powerful oxidizing agent and when dissolved in water forms a bleaching-sterilizing solution suitable for sterilizing instruments, such as those used in medical procedures.

Most ozone is generated through a corona discharge technique. Approximately 88% to 90% of the power applied in the corona discharge technique is transformed into heat, which contributes to the dissociation of the ozone which is formed. Above 373° K, ozone decomposes. Known corona discharge units are fairly large, on the order of 0.1 cubic meter, and require permanent installation. Such units are generally powered by 220 vac and will draw approximately 20 amps and 1.5 kw. The result is a conversion rate of approximately 2% oxygen to ozone. Generally, some type of cooling is required throughout the conversion process, either to chill the feedstock gas or to cool the conversion chamber.

The corona discharge technique supplies enough energy to energize an oxygen atom to a level slightly above its first ionization potential which is approximately 13 ev per molecule. This level is sufficient to dissociate the electrons in the outer, or third ring. To dissociate electrons from the second ring requires approximately 35 ev and the removal of all electrons from the atoms requires approximately 55 ev. With known ozone generators, application of energy sufficient to dissociate electrons in the second or third ring generates enough heat to destroy the ozone already produced and may destroy the generator.

Toxic organic products are particularly difficult to neutralize. Polychloride biphenyls (PCBs) are known carcinogens and pose a threat to current and future life. Organic compounds, such as benzene, are also toxic to animal and plant life and must be neutralized or placed in long-life sealed containers prior to disposal.

DISCLOSURE OF THE INVENTION

The energizer of the instant invention includes an electric discharge apparatus for creating an electric discharge and a focusing mechanism for focusing the electric discharge on a fluid to be energized. In a preferred embodiment of the invention, the focusing mechanism takes the form of a dielectric core which is constructed and arranged to focus the electric discharge into a passage formed about the periphery of the core thereby enabling the use of energy levels substantially higher than would be possible without the focusing means. An alternate form uses a substantially flat plate having a fluid passage formed therein.

A method of energizing a fluid is taught which includes introducing the fluid into a confined region, providing an electric discharge for energizing the fluid and focusing the discharge into the confined region.

A power supply for the electric discharge has a range of about 20 kv to 320 kv and a slew rate of at least 1300 volts per microsecond.

Although the primary example used herein deals with the formation of ozone from oxygen, it should be appreciated that the method and apparatus of the invention are useful to promote the change in state of any fluid material, whether allotropic or non-allotropic.

These and other objects and advantages of the instant invention will become more fully apparent as the description which follows is read in conjunction with the drawings.

BEST MODE OF CARRYING OUT THE INVENTION

Figure 1:
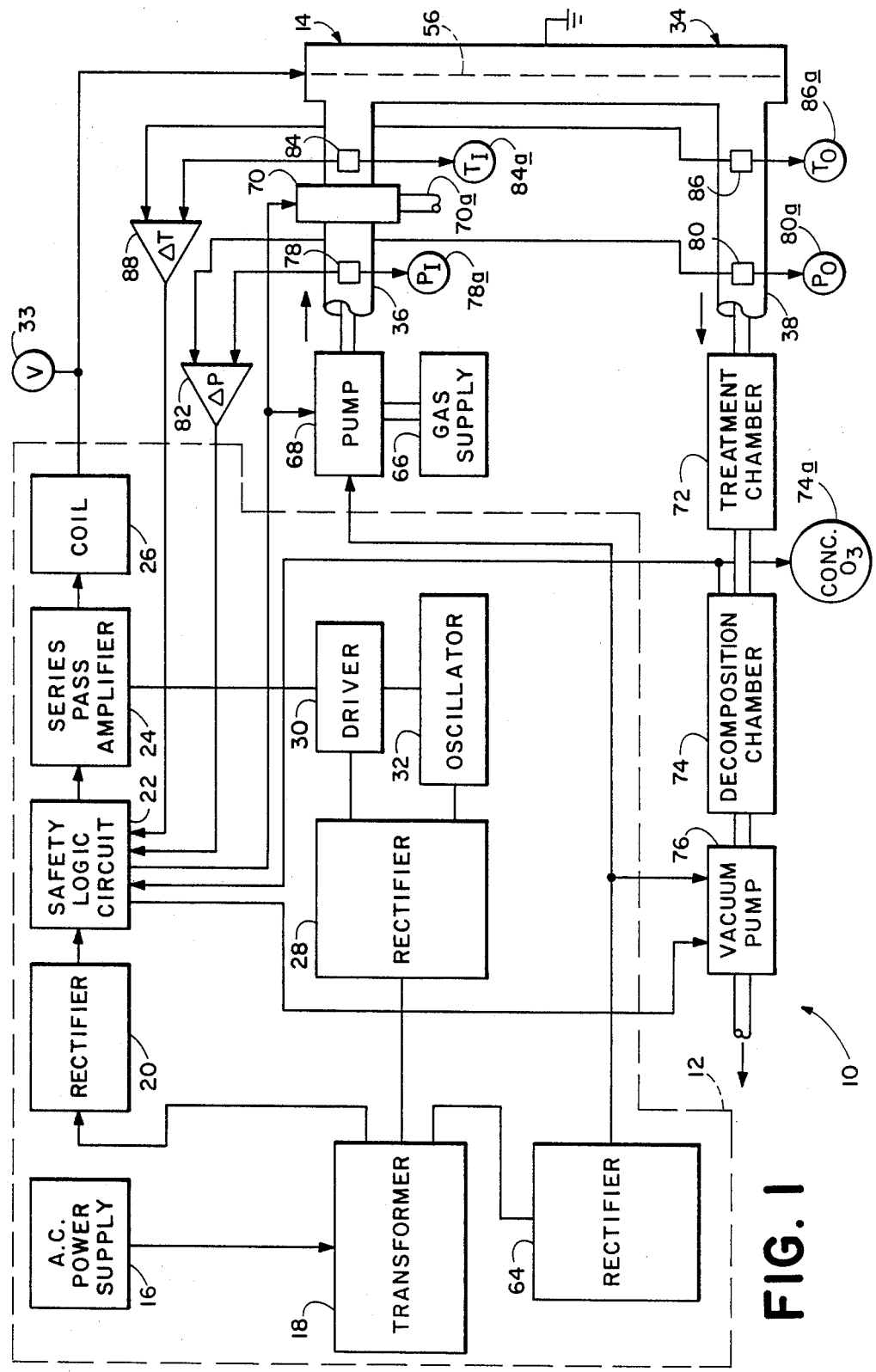
FIG. 1 is a block diagram of a fluid energizer utilizing an electric discharge apparatus constructed according to the invention.

Referring initially to FIG. 1, an electric discharge energizer for energizing a fluid is depicted generally at 10. Energizer 10, in this configuration, is particularly suitable for converting oxygen into ozone and then utilizing the ozone to sterilize medical instruments or purify a water supply. The preferred embodiment will be described herein as an oxygen to ozone converter.

Energizer 10 includes power supply means 12 and an electric discharge conversion tube or apparatus 14. Additionally, components for handling a gas to be energized and for handling the energized gas are provided, and will be discussed later herein.

Power supply means 12 includes an A.C. power supply 16 which, in the preferred embodiment, includes means for connecting energizer 10 to a 110 volt A.C. line and means for interrupting the A.C. power to the apparatus.

The A.C. power is transferred into transformer 18 which, in the preferred embodiment, is of the multitap configuration and which provides an electric current at predetermined voltages at its various terminals.

A rectifier 20 is connected to transformer 18 and, in the preferred embodiment, is switchable between transformer terminals providing 45 volts and 90 volts. In normal operations, rectifier 20 is connected to the 90 volt terminal of transformer 18.

The rectified current next enters a safety logic circuit 22. Logic circuit 22 is operable to interrupt the flow of power to conversion tube 14 if certain operating parameters, to be discussed later herein, are not met.

The current next enters series pass amplifier 24 which includes a mechanism for adjusting the voltage prior to the current reaching coil 26.

A second rectifier 28 is attached to transformer 18 and, in the preferred embodiment, provides a 28 volt D.C. power supply to a driver 30 and an 8 volt D.C. power supply to an oscillator 32. Oscillator 32 and driver 30 are operable with amplifier 24 and coil 26 to provide a power supply providing 0–350 kv with a slew rate in excess of 1300 volts per microsecond over a frequency of 400 hz up to the gigahertz range, depending upon the dielectric material used in tube 14. Voltage output of coil 26 may be monitored by a volt meter 33 as the current is directed into conversion tube 14.

Figure 2:
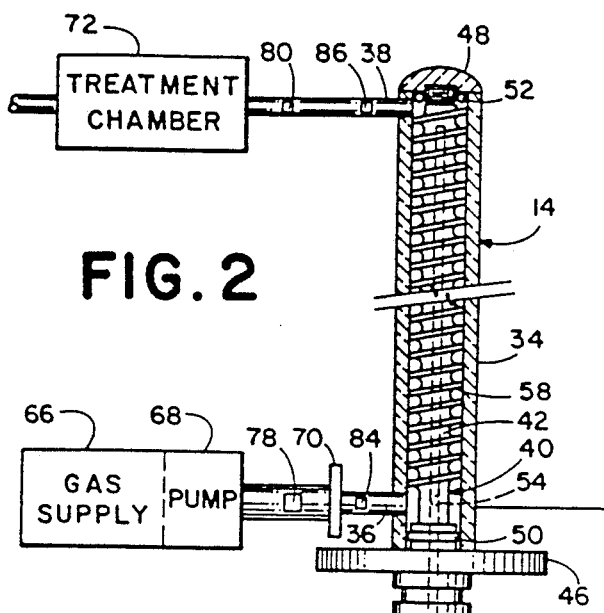
FIG. 2 is a plan view of a conversion tube constructed according to the invention, with portions broken away to show detail.
Figure 3:
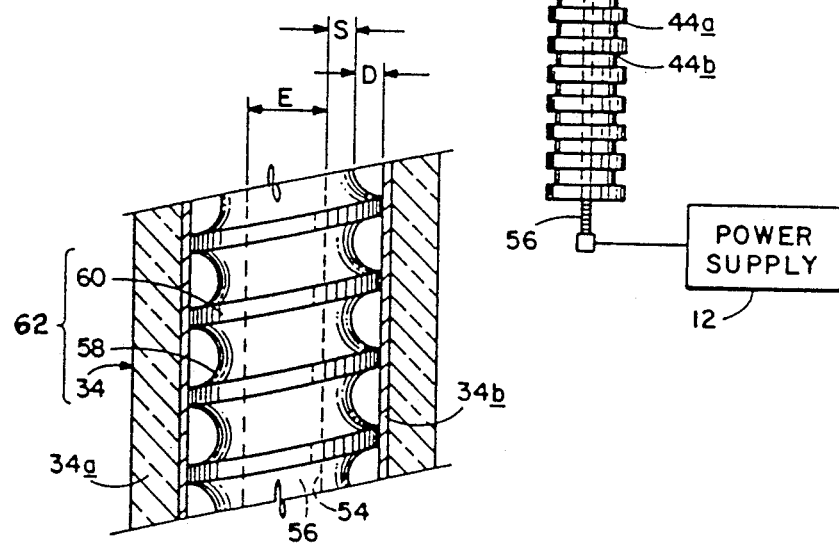
FIG. 3 is a partial enlarged view of the conversion tube of FIG. 2.

Referring now to FIG. 2, conversion tube 14 is shown in greater detail. Conversion tube 14 includes a first hollow tubular electrode, or housing 34 which, in the preferred embodiment, is formed from a hollow tubular conductive material. Electrode 34, and referring momentarily to FIG. 3, is preferably formed of aluminum or copper alloy as shown at 34a. A non-reactive inner liner 34b may be provided in some instances to enhance the production of energized fluid. One material that is suitable for inner liner 34b is platinum, which may be electroplated on the inner surface of aluminum or copper alloy conductor 34a. Referring again to FIG. 2, electrode 34 includes a fluid inlet 36 adjacent one end thereof and a fluid outlet 38 adjacent the other end thereof.

A dielectric core, shown generally at 40, includes a conversion portion 42 which is clearance fittably received inside first electrode 34. Core 40 also includes a high voltage insulator portion 44 which is configured with numerous sharp, angular formations, such as corners 44a and 44b, to dissipate any electrical buildup.

An arcshield 46 is located between insulator portion 44 and electrode 34 and is operable to minimize arcing between insulator portion 44 and electrode 34.

Electrode 34 has a cap 48 at the end opposite arcshield 46. Seals, or 0-rings, 50, 52 are provided to ensure a tight seal between the conversion portion and electrode 34, and cap 48 and electrode 34, respectively. As the primary fluid to be energized is oxygen, the resultant product is ozone and the seals must therefore be made of ozone resistant material, such as polyethylene, acrylic, ceramic, silicon or silicone based material. Core 40 has an axially central bore 54 extending the length thereof. A second, rod-like, inner electrode 56 extends through bore 54 and is connected in series with the output of coil 26.

Core 40 has a helical groove 58 formed on the outer periphery thereof. The helical form is used to provide a maximum length for groove 58 although other patterns, such as straight line grooves extending the length of core 40, may also be used. Referring momentarily to FIG. 3, core 40 is shown in greater detail with electrode 34 broken away. Groove 58 is cut into the periphery of core 40 such that a continuous land 60 remains. Land 60 is snugly fitted against the inner surface of electrode 34 and thereby allows groove 58 in the inner surface of electrode 34 to form a fluid passage 62 in conversion tube 14.

Groove 58 is formed such that it has a semicircular cross section when viewed parallel to the direction of fluid flow through passage 62.

Electrodes 34 and 56 comprise what is referred to herein as electrode discharge means. A high voltage charge from power supply 12 generates an electric field discharge in the fluid passage between electrodes 34 and 56. Core 40 is constructed and arranged to focus the electric discharge into passage 62. The bottom and sides of groove 58 are therefore cut as a concave lens to take advantage of the focusing properties of the dielectric material of core 40, thus focusing the discharge into the passage. Core 40 may be formed from material such as glass, nylon, acrylic, or polymers such as Teflon ®1 or Flourisint (Teflon ® with a ceramic filler).

1. Teflon ® is a registered trademark of E. I. DuPont de Nemours & Co. for a synthetic resinous fluorine-containing polymer.

Formation of dielectric core 40, also referred to herein as focusing means or focusing mechanism, may be accomplished by molding or by milling. The core, as previously noted, focuses the electric discharge into a passage. This is referred to herein as focused electropotential stress and results in high level electron dissociation of the material being energized. In the configuration described, electron volt energy levels in excess of 168 kv/mm can be achieved. Corona discharge units typically operate at an electron volt energy level of about 2000 volts/mm. Needless to say, the energy levels achieved by the instant invention are sufficient to also dissociate the electrons within the dielectric material as well as the media to be converted. Teflon ® has a dielectric strength of approximately 600 volts/0.025 mm, while Flourisint has a dielectric strength of approximately 400 volts/0.025 mm. The media to be converted must have a dielectric strength and constant less than that of the material used in the core.

It is important that the groove formed in the dielectric control the point of greatest electropotential stress in addition to determining the pattern of electropotential stress applied to the medium to be energized. If the bottom of the groove is too flat, an uneven electropotential stress will be applied to the junction between the bottom and side walls of the groove and the core will fail. If the groove has too sharp a radius at its bottom, excessive electropotential stress will be applied at the center of the groove and the dielectric will fail at the deepest portion of the cut.

The proper amount of curve to depth ratio appears to be determined by the electrical characteristics of the dielectric material used in relation to the medium to be energized.

In the embodiment shown in FIGS. 2 and 3, specifically used for converting oxygen to ozone, and using Flourisint as the core material, groove 58 was formed with a depth D of about 2.97 mm and a radius R of about 3.12 mm. A distance S of about 2.39 mm was left between the bottom of the groove and the outer surface of electrode 56. Electrode 56 has a diameter E of about 2.75 mm.

Returning now to FIG. 1, a third rectifier 64 is connected to transformer 18 and provides, in the preferred embodiment, a 12 volt D.C. power supply. This power supply is used to operate the fluid handling components of energizer 10. As previously noted, the conversion apparatus of the invention may be used with either a liquid or gas medium. In the embodiment being described, a feedstock gas supply 66 includes containers of oxygen which is the medium to be energized. A pump 68 is operable to supply the gas at a predetermined rate into inlet 36. An electrically controlled valve 70 is operable to cut off the supply of gas upon receipt of an appropriate signal from logic circuit 22. Valve 70 has a second entry port 70a which is operable to allow the entrance of ambient air or inert gas into conversion tube 14 in the event of conversion tube shutdown by circuit 22.

Gas entering inlet 36 circulates through passage 62 and exits through outlet 38 where it is drawn into a treatment chamber 72. Treatment chamber 72 may contain a quantity of water which will absorb the ozone, becoming a sterilizing solution, or treatment chamber 72 may be constructed to allow the passage of a water supply therethrough with ozone being bubbled through the water during transit, the energizer thereby acting as a water purifier.

Because of the undesirability of releasing free ozone into the lower atmosphere, a decomposition chamber 74 is provided which contains catalytic or reactive material to promote the decomposition of ozone. Chamber 74 includes a sensor 74a which is operable to detect the level of ozone in chamber 74. The sensor may provide visual and/or audible warnings if the level of ozone exiting chamber 74 is above established maximums. The sensor will also transmit a signal to circuit 22 if the exhaust level of ozone is too high, thereby interrupting the flow of current and feedstock gas to conversion tube 14. A vacuum pump 76 is operable to maintain the flow of fluid through conversion tube 14, chamber 72 and chamber 74. Vacuum pump 76, valve 70 and chamber 74 comprise what is referred to herein as evacuation means.

Attention must be paid to the explosive nature of ozone in concentrations above 15%. The energized gas in conversion tube 14 must flow at a predetermined rate to prevent the energization of oxygen to the extent that ozone is produced in concentrations above 15%. To this end, two sets of sensors are provided to measure temperature and pressure across conversion tube 14.

The first set of sensors include an inlet pressure ($P_I$) sensor 78 and an outlet pressure ($P_O$) sensor 80, also referred to herein as pressure sensing means. The pressure of the gas in tube 14 will drop as oxygen is converted to ozone. Pressure should therefore be higher at inlet sensor 78 than at outlet sensor 80. Output from sensor 78 and 80 provides an input for differential amplifier 82 which compares the signals from sensor 78 and 80. When a comparison of the input and output signals indicates that there is a zero or negative pressure differential between the inlet and outlet of tube 14, amplifier 82 sends a pressure signal to logic circuit 22 indicating that the fluid pressure in tube 14 is outside a predetermined range. Circuit 22 acts as a power supply disabling means and interrupts the flow of current to series pass amplifier 24, thereby prohibiting operation of coil 26 and the electric discharge means. The detection of a pressure at sensor 78 greater than that at sensor 80 will cut off the pressure signal from amplifier 82, thereby allowing operation of the system. Monitors 78a and 80a provide an indication of actual gas pressure at inlet 36 ($P_I$), at the location of sensor 78, and of actual gas pressure at outlet 38 ($P_O$) at the location of sensor 80, respectively.

Additionally, the concentration of ozone may be controlled by adjusting the flow rate of the oxygen being converted. A flow rate of 1 liter/min. has been found to provide concentrations of ozone of about 7% for the apparatus as described. Lower flow rates generally will result in higher ozone concentrations.

A second set of sensors include an inlet temperature ($T_I$) sensor 84 and an outlet temperature ($T_O$) sensor 86, also referred to herein as temperature sensing means. The temperature sensors are connected to thermal differential amplifier 88 and to temperature indicators 84a and 86a. As previously noted, ozone will virtually completely decompose at a temperature of 373° K. Sensor 86 detects the gas output temperature. Amplifier 88 is operable to send a temperature signal indicative of the fluid temperature in the passage to logic circuit 22 which, depending upon the temperature of the output gas, may adjust the current entering series pass amplifier 24 and coil 26 or, if the temperature approaches 373° K, will interrupt the current to conversion tube 14, shut off pump 26, shift valve 70 to a position where it draws in gas from port 70a and continue to operate vacuum pump 76 until conversion tube 14 is cleared of energized gas.

Figure 4:
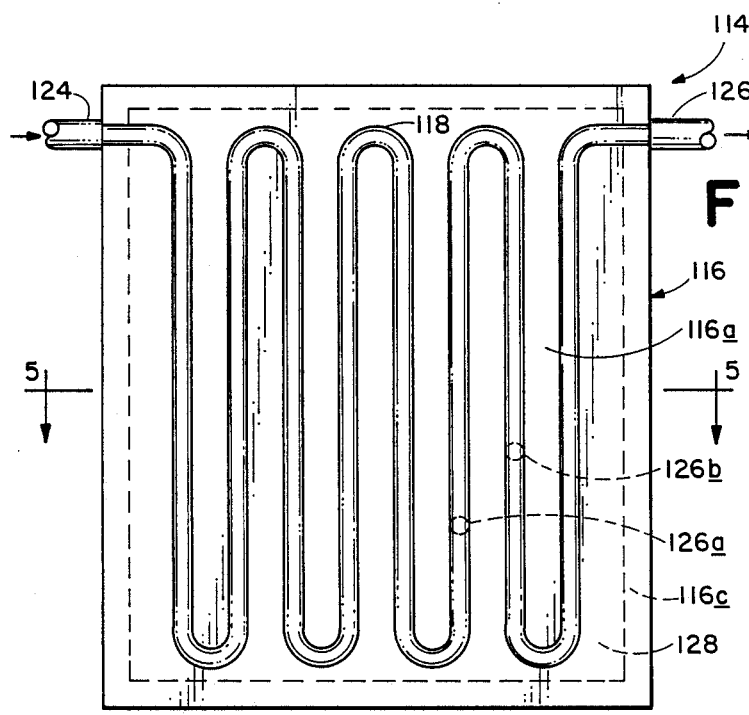
FIG. 4 is a top plan view of a flat plate discharge apparatus constructed according to the invention, with portions broken away to show detail.
Figure 5:
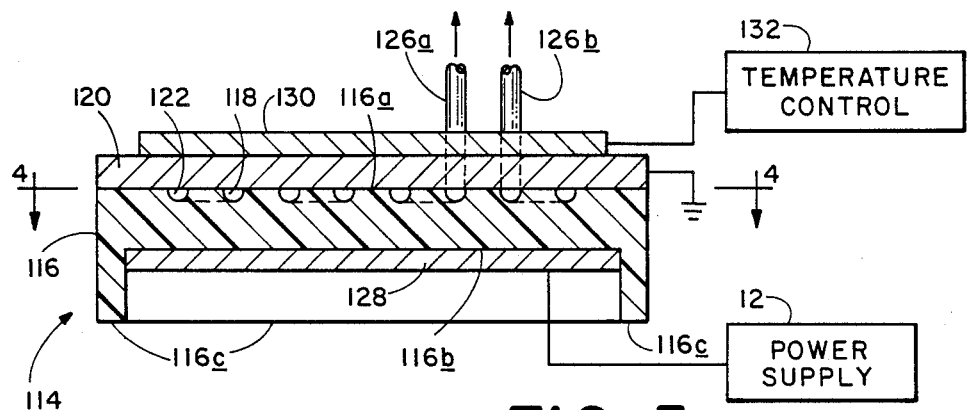
FIG. 5 is a cross section of the flat plate apparatus of FIG. 4 taken generally along the line 5—5 in FIG. 4.

Referring now to FIGS. 4 and 5, a flat plate electric discharge apparatus is shown generally at 114. Apparatus 114 may be used in place of conversion tube 14 in energizer 10.

Apparatus 114 includes a dielectric core 116, which is formed as a flat plate. Core 116 has a serpentine groove 118 formed in a major side 116a thereof. A first flat plate electrode 120 is fixed to side 116a of core 116 in order to form, with groove 118, a passage 122 for a fluid to be energized. Suitable connections are made with passage 122 to form an inlet 124 and an outlet 126 for the fluid. A second electrode 128 is secured to the other major side 116b of core 116 and is attached to a power supply, such as power supply 12.

Core 116 has an integral arcshield 116c formed therewith and fixed to side 116b. Second electrode 128 is contained within the walls of shield 116c. Shield 116c is operable to prevent an electrical discharge between the first and second electrodes around the periphery of core 116. This ensures that the energy applied to electrodes 120 and 128 will be directed through core 116 and focused into passage 122. The thickness of core 116 is selected such that it has a thickness between electrodes 120 and 128 of about three times the depth of passage 122. In the preferred embodiment, passage 122 is cut to a depth of about 3.30 mm with a radius at the bottom of the groove of about 1.65 mm.

Apparatus 114 is particularly suitable for reducing complex organic molecules into simple compounds or elemental matter. To this end, the apparatus in the preferred embodiment is constructed similar to a fractional distillation column in that multiple outlets, such as those shown at 126, 126a and 126b are provided whereby energized fluid may be drawn off along the length of the passage.

Because some materials may deposit portions of their fractional components when energized, temperature adjusting plate or means 130 is provided to maintain a desired temperature along passage 122. Plate 130 may have its own temperature control 132 to maintain such a desired temperature. Such a temperature adjusting means may, of course, also be provided with conversion apparatus 14.

Core 116 may be formed from any suitable dielectric although a preferred material is ceramic in nature and is formed into the desired configuration by molding or casting.

Figure 6:
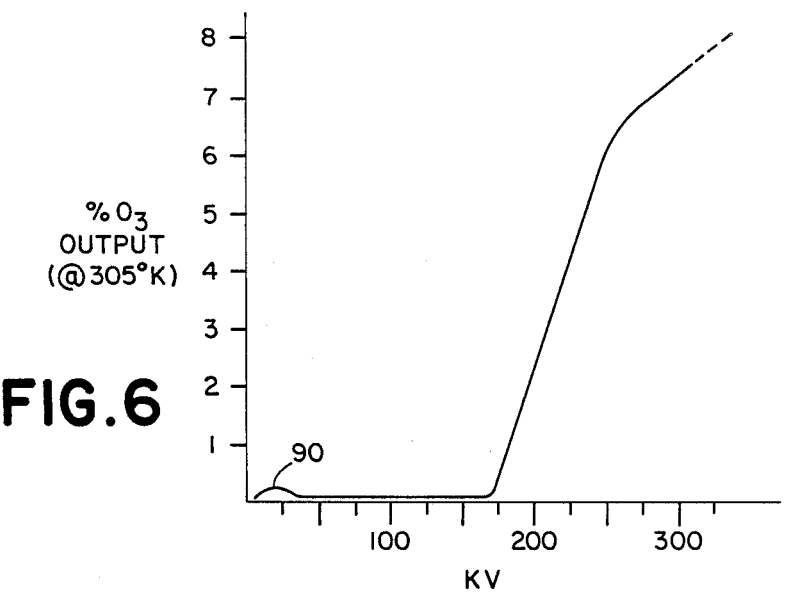
FIG. 6 is a graph depicting ozone output versus energy input from 0–350 kv by the conversion tube of FIG. 3.

Referring now to FIG. 6, a graph represents the production of ozone from an oxygen feedstock gas at various energy levels in apparatus 14. The initial ozone output, indicated at 90, occurs at approximately 15 kv. This rise has almost completely disappeared by the time the energy input reaches 50 kv and remains negligible until approximately 150 kv is reached. Between 50 kv and 150 kv a great amount of heat is generated as virtually all of the energy going into the conversion apparatus is converted to heat. Above 150 kv, and particularly above 175 kv, ozone output increases dramatically. It is at this level that electrons are stripped off of the inner rings of the atom facilitating greater recombination between an energized oxygen atom and an $O_2$ molecule.

Figure 7:
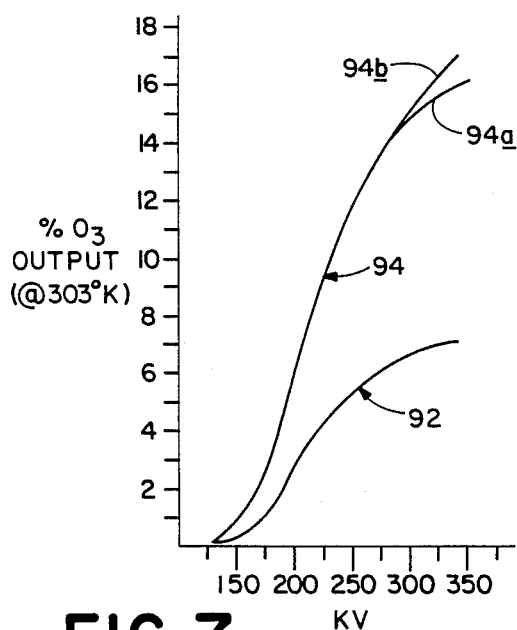
FIG. 7 is a graph depicting ozone output versus energy input from 150 kv to 350 kv by the conversion tube of FIG. 3.

Referring now to FIG. 7, the output of ozone versus voltage input is depicted for a gas flow of 1 liter per minute, line 92, and a gas flow of ¼ liter per minute, line 94. Note that line 94 bifurcates at approximately 275 kv. This bifurcation is the result, in the case of line 94a, of ozone generation utilizing a platinum lined (34b) electrode 34, whereas line 94b represents ozone generation utilizing an unlined, aluminum alloy electrode 34. Although ozone production drops off slightly with the platinum lined tube, the lining enables conversion to continue at higher energy levels.

Figure 8:
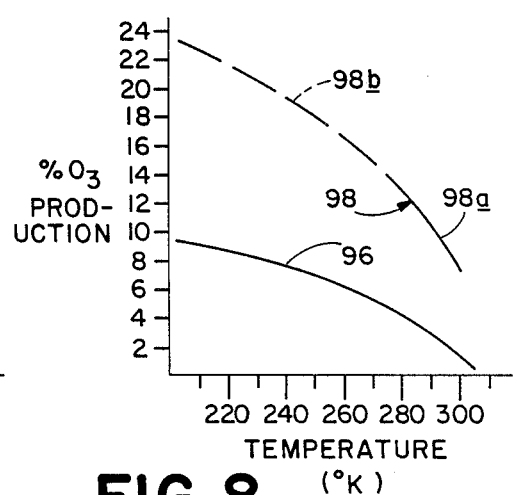
FIG. 8 is a graph depicting ozone output versus temperature.

Turning now to FIG. 8, percentage ozone output as a function of temperature is depicted for a standard corona discharge unit by line 96. Output of the energizer of the instant invention is depicted by line 98. Actual measured data is depicted by solid line 98a while extrapolated data is indicated by line 98b. The energizer of the instant invention is capable of efficient ozone production at normal environmental temperatures, while other ozone generators usually require external cooling to obtain efficient results.

The energizer of the invention is a unit of relatively small size, less than 0.05 cubic meters in the medical sterilizer embodiment, and is designed to operate at room temperature and is powered by a conventional 110 vac power supply. The units described herein draw less than 1 amp at 98 watts. Conversion rates of 22–23% may be achieved at room temperatures utilizing the conversion tube embodiment and up to 14% using the flat plate embodiment. The energizer is generally operated at the conversion rate of 7–10% for safety reasons.

TEST RESULTS

To demonstrate the utility of the apparatus described herein as a sterilizer, tests were conducted on various forms of virus and bacteria laden medium.

BACILLUS SUBTILIS

One test investigated the kill rate of *Bacillus subtilis* on intentionally contaminated surgical instruments. Although most surgical instruments are susceptible to sterilization in an autoclave, many instruments are now made from plastic-type materials which will not tolerate the temperatures produced in an autoclave. Sterilization of such instruments is an alternative to destruction of instruments after a single use.

In the tests, Bacillus was grown in trypic soy agar (TSA) and was transferred to Difco brand trypic soy broth 24 hours prior to the experiment. Oxygen was converted to ozone by the apparatus at a flow rate of 1 liter/min. The ozone was bubbled through a treatment chamber containing 25 liters of deionized water for five minutes prior to beginning the test. The ozone level was measured by a Hatch tester at a level of 1.4 mg/liter. Surgical instruments were inoculated with 5 ml of culture containing approximately $9.2 \div 106$ bacteria/ml, or a total population of approximately 45 million bacteria.

The surgical instruments were transferred into the tank and a 1 ml sample of broth containing culture was also placed in the tank, above the water level. The surgical instruments were aseptically removed from the tank at 3, 5, 10 and 15 minute intervals and were then used to inoculate sterile broth tubes. The tubes were incubated at 34.6° C. for 24 hours and the liquid then used to inoculate plates containing TSA. The TSA plates were incubated at 34° C. for an additional 24 hours and then read. Sterile swabs were wiped across the top and sides of the tank and were streaked onto TSA plates which were incubated as described.

In the course of one test, the sample which had been removed at three minutes showed some bacterial growth at 48 hours. In other tests, there was no growth from the three minute sample at 48 hours. The remaining samples showed no growth in any of the tests. Likewise, the sterile swabs showed no growth and the 1 ml sample of broth containing culture was determined to have been totally sterilized after five minutes in the chamber. At the end of the 15 minutes test, ozone concentration was 100.45mg/25 liters (4.02 mg/liter).

ENTEROVIRUS/HERPES SIMPLEX VIRUS

Additional tests were performed on enteroviruses, such as those responsible for polio and encephalitis and also on herpes simplex virus. The specific viruses were herpes simplex, type 2 (HSV) and Coxsackie B6 (Cox B6). In these tests, stainless steel trays were sectioned off and inoculated with the viruses in what is known as a dry gas phase. A pool of each virus was grown and titered prior to the ozone studies. The HSV was grown in mink lung cells maintained in Eagles minimum essential media (EMEM) supplemented with 2% fetal calf serum and had a titer of $>10^7$ TCID$_{50}$/0.2 ml. The Cox B6 was grown in BGM cells also maintained in 2% EMEM and had a final titer of $>10^7$ TCID$_{50}$/0.2 ml. All HSV titrations were done in mink lung cells and all Cox B6 titrations were done in BGM cells.

The survival of virus on stainless steel and glass in the presence of ozone was determined by spotting several small aliquots of virus (0.01 ml for Cox B6 and 0.1 ml for HSV) onto either glass slides or a stainless steel surface. The spots were allowed to dry and then one set of spots was placed in the ozone chamber (treated surface) and another was exposed to air at room temperature (control surface).

Ozone was generated by the apparatus from an oxygen gas supply at a flow rate of 1 liter/min. A conversion tube energized to 250 kv was used to generate the ozone. A treatment chamber was filled with 25 liters of deionized water and the trays placed above the water line in the tank. Samples were taken at 3, 5 and 10 minute intervals. At the prescribed time intervals, a spot on the treated surface and a spot on the control surface were swabbed with a Dacron swab moistened with 2% EMEM and the swabs were eluted into 2% EMEM which was then frozen at −70° C. before the virus titrations were done.

The survival of virus in water was determined by putting 2.5 ml of the stock virus pool into the water bath of the ozonation chamber. An aliquot of the bath was then sampled for virus at different time intervals. All of the experiments were done in triplicate.

The ozone treatment did not completely eradicate either virus from either steel or glass in the gas phase tests. The viruses were, however, rapidly inactivated following exposure to gas phase ozone. The enterovirus and HSV were completely inactivated within three minutes when suspended in the water bath of the chamber.

ESCHERICHIA COLI

Use of the apparatus in a water treatment system was tested by determining the kill rates on *E. Coli*. Twenty-five liters of water were innoculated with 300 ml of solution containing *E. Coli* in a concentration of $2.86 \times 10^6$/ml. Ozone was generated by the apparatus from an oxygen gas supply at a flow rate of 1 liter/min. A conversion tube energized to 250 kv was used to generate the ozone. A water sample was removed after 15 minutes of treatment. The water sample was determined to contain 1,290 *E. Coli* per ml.

PCBs

Tests were conducted to determine the effectiveness of the apparatus for neutralizing PCBs. Specifically, tests were conducted using 4,4'-dichlorobiphenyl and 2,6,2',6'-tetrachlorobiphenyl. In these tests, approximately 59 ml of mineral oil containing 500 parts per million of PCB were placed in a round bottom flask. Ozone, produced from an oxygen gas supply energized at 250 kv having a flow rate of 0.3 liters/min., was bubbled through the PCB-containing oil for two hours. A column having a glass fritt on the end thereof was placed adjacent the bottom of the flask. At the end of two hours, the oil contained suspended white particles which collected at the bottom of the flask in approximately 24 hours. The particles have been determined to be various forms of harmless polymers which could be buried without the threat of ground or water contamination or which could be additionally refined into useful products. Analysis of the mineral oil indicated that there were no PCBs remaining in suspension following the tests.

A second PCB test was conducted using 200 g of mineral oil having 50 mg of PCB and 10 g of octain (mixing agent) added thereto. A flow rate of oxygen of 1 liter/min. was used and was energized at a level of 225 kv. The resultant ozone was bubbled through the PCB-containing oil as in the previous experiment. Samples were pulled at 22.5, 30 and 37.5 minutes. All of the samples indicated that PCBs had been neutralized completely.

BENZENE

As previously noted, the apparatus of the invention is also useful in converting organic compounds into less complex compounds or elemental components. One such series of tests investigated the effect of focused electropotential stress on benzene. In this series of tests, argon gas was bubbled through benzene and the resultant mixture run through the conversion apparatus of the invention. Argon was bubbled into the benzene for nine minutes, thereby absorbing 0.35 grams of benzene. A spectrometer set for the 254 nanometer range, which is a wavelength which will absorb benzene, was connected to the outlet of the conversion apparatus. During the course of the test, no benzene was detected at the output. Elemental hydrogen was, however, detected and a plastic material was deposited in the passage close to the inlet with a black substance being deposited in the passage further along its length.

$NO_x$ GENERATION

Although the ozone generating tests described thus far have used $O_2$ as a gas stock, the apparatus of the invention may also use air as a feedstock and does so without generating nitrogen oxides. This was established by tests in which the pH of the waterbath was measured.

One of the reactions which would be expected as a result of energizing air would be the formation of nitrogen oxide (NO) which, when combined with water would produce nitric acid ($HNO_3$). First, a test to establish the pH of a water bath containing ozone was conducted by using $O_2$ as a gas feedstock. The oxygen was energized at a level of 200 kv, and had a 1 liter/min. flow rate. The energized gas was bubbled into 1 liter of water. The resultant pH was measured as 3.75 after 2.5 minutes. A similar test was then conducted using air as the gas stock. The resultant pH was determined to be 3.64 after five minutes and 3.33 after ten minutes. Although there was some decrease in pH when air was used as the gas feedstock, the change is not of the order which would indicate a significant level of nitrogen oxide production. If the energizer were producing nitrogen oxide as efficiently as it produces ozone, a pH of between 1.0 and 2.0 could be expected. As such a pH level was not measured, it may be concluded that an insignificant amount of nitrogen is converted to an oxide of nitrogen by the energizer.

Industrial Application

The invention is applicable to the efficient production of energized fluids, particularly the production of ozone from oxygen or air and is additionally applicable for reducing complex organic molecules into simple compound or elemental matter. Specific applications may be found in the sterilization of medical instruments, the treatment of water supplies to remove harmful bacteria, and the neutralization of toxic compounds.

The invention is not restricted to the particular embodiments which have been described, since variations may be made therein without departing from the scope of the invention as defined in the appended claims.

I claim:

1. A method of energizing a fluid comprising:
   providing a first and second electrode having a dielectric material interposed therebetween
   introducing the fluid into a confined region located between an electrode and the dielectric material;
   providing an electric discharge for energizing the fluid; and
   focusing the electric discharge into the confined region with the dielectric material.

2. Electric discharge energizer for energizing a fluid comprising:
   electric discharge means for creating an electric discharge including a first electrode and a second electrode; and
   focusing means for focusing the electric discharge on the fluid to be energized, wherein said focusing means includes a dielectric core which is interposed between said first and second electrodes.

3. The energizer of claim 2 wherein said dielectric core includes a passageway for the fluid, said dielectric core and passage being constructed and arranged to focus the electric discharge into the passage.

4. The energizer of claim 3 wherein said first electrode has a substantially hollow tubular form and wherein said second electrode has a substantially rod-like form.

5. The energizer of claim 3 wherein said dielectric core includes a conversion portion having an axially central bore therein for receiving said second electrode and which further includes a groove disposed on the periphery of said conversion portion, said dielectric core being clearance fittably receivable in said first electrode such that said groove and the inner surface of said first electrode form said passage.

6. The energizer of claim 5 wherein said groove has a helical pattern about said dielectric core and wherein said groove has a substantially semicircular cross section.

7. The energizer of claim 3 wherein said dielectric core is a substantially flat plate having a groove formed along one major side thereof, said first electrode is of the flat plate type and is fixed to the aforementioned major side, said groove and said first electrode thereby forming said passage; and wherein said second electrode is fixed to the other major side of said dielectric core.

8. The energizer of claim 4 or 7 wherein said first electrode has a substantially non-reactive lining facing said passage.

9. The energizer of claim 3 which further includes temperature adjusting means to provide a desired temperature in said passage of an energized fluid.

10. The energizer of claim 3 which further includes power supply means connected to said first and second electrodes, said power supply means being constructed and arranged to generate an electric discharge across said first and second electrodes in a range of about 20 kv to 320 kv, and having a slew rate of at least 1300 volts per microsecond above 400 hz.

11. Electric discharge energizer for energizing a fluid comprising:
an outer, hollow tubular electrode having an inlet adjacent one end thereof and an outlet adjacent the other end thereof;
a rod-like, inner electrode;
a power supply for providing an electric discharge between said outer electrode and said inner electrode;
a dielectric core, having focusing means therein, disposed between said inner electrode and said outer electrode, said dielectric core having a central bore therein for receiving said rod-like inner electrode, fluid passage means connecting said inlet and said outlet, said focusing means being constructed and arranged to focus a discharge into said passage means; and
a fluid supply connected to said inlet for providing a supply of fluid to be energized.

12. The energizer of claim 11 wherein said rod-like inner electrode has a known diameter and said passage means has a depth such that the distance between the bottom of the passage means and said rod-like inner electrode is about one-half the diameter of said rod-like inner electrode.

13. A device for energizing a fluid comprising:
an outer conductive housing having a fluid inlet and a fluid outlet;
a non-conductive, discharge focusing core disposed in and extending along said outer conductive housing, said non-conductive, discharge focusing core having a central bore extending axially therealong and having a fluid passage connected with said inlet and said outlet for allowing passage of a fluid therethrough, said non-conductive, discharge focusing core being constructed and arranged to focus an electric discharge into said fluid passage;
a rod-like electrode disposed in said central bore; and
a power supply connected to said outer conductive housing and to said rod-like electrode for generating an electric discharge.

14. The device of claim 13 wherein said non-conductive, discharge focusing core includes a conversion portion having an axially central bore therein for receiving said rod-like electrode and which further includes a groove disposed on the periphery of said conversion portion, said conversion portion being clearance fittably receivable in said outer conductive housing such that the said groove and the inner surface of said outer conductive housing form said passage.

15. The device of claim 14 wherein said groove has a helical pattern about said non-conductive, discharge focusing core and wherein said groove has a substantially semicircular cross section.

16. The device of claim 13 wherein said power supply includes a high voltage coil connected in series with said rodlike electrode.

17. Electric discharge energizer for energizing a fluid comprising:
a first substantially flat-plate electrode;
a second substantially flat-plate electrode spaced apart from said first electrode;
a power supply for providing an electric discharge between said first substantially flat-plate electrode and said second substantially flat-plate electrode;
a dielectric core interposed between said first and second substantially flat-plate electrodes, said dielectric core having a groove formed on one side thereof adjacent said first substantially flat-plate electrode, said groove and said first substantially flat-plate electrode forming a passage for the fluid to be energized, said groove being constructed and arranged to focus an electric discharge into said passage; and
a fluid supply connected to one end of said passage for providing a supply of fluid to be energized.

18. The energizer of claim 17 wherein said dielectric core includes an arc shield integrally formed therewith for preventing a discharge between said first and second substantially flat-plate electrodes about the periphery of said core.

19. The energizer of claim 17 wherein said passage includes multiple outlets thereby allowing the withdrawal of energized fluid at multiple points along the length of said passage.

20. The energizer of claim 17 wherein said dielectric core is constructed and arranged such that said passage has a known depth and the distance between the bottom of the passage and said second electrode is about twice the depth of said passage.

21. The energizer of claim 17 wherein said power supply includes a high voltage coil connected in series with second substantially flat-plate electrode.

22. The energizer of claim 17 which further includes temperature adjusting means to provide a desired temperature in said passage of an energized fluid.

23. Electric discharge energizer for energizing a fluid comprising:
- a first electrode;
- a second electrode spaced apart from said first electrode;
- a power supply for providing an electric discharge between said first electrode and said second electrode;
- a dielectric, focusing core disposed between said first and second electrodes, said dielectric, focusing core having a fluid passage therein including an inlet and an outlet for allowing passage of a fluid therethrough, said dielectric, focusing core being constructed and arranged to focus an electric discharge into said fluid passage thereby producing an energized fluid;
- a fluid supply connected to said inlet for providing a supply of fluid to be energized;
- a treatment chamber connected to said outlet for receiving the energized fluid and a substance to be treated by the energized fluid;
- a decomposition chamber connected to said treatment chamber for allowing decomposition of unexpended energized fluid; and
- evacuation means for drawing the energized fluid through said treatment and decomposition chambers.

24. The energizer of claim 23 which includes temperature sensing means for generating a temperature signal indicative of the temperature of the energized fluid in said fluid passage and wherein said power supply includes disabling means operable to disable said power supply upon receipt of the temperature signal indicative of a fluid temperature outside of the predetermined range.

25. The energizer of claim 23 which includes fluid pressure sensing means for generating a pressure signal indicative of the pressure of the energized fluid along said fluid passage and wherein said power supply includes disabling means operable to disable said power supply upon receipt of a pressure signal indicative of pressure of the energized fluid outside of a predetermined range.

26. The energizer of claim 24 or 25 wherein said disabling means is further operable to shut off the supply of fluid to said inlet.

* * * * *